US007967542B2

(12) United States Patent
Epp et al.

(10) Patent No.: US 7,967,542 B2
(45) Date of Patent: Jun. 28, 2011

(54) BIN SWEEP AUGER

(76) Inventors: Richard J. Epp, Fiske (CA); Dwayne S. Epp, Fiske (CA)

( * ) Notice: Subject to any disclaimer, the term of this patent is extended or adjusted under 35 U.S.C. 154(b) by 1305 days.

(21) Appl. No.: 11/098,617

(22) Filed: Apr. 5, 2005

(65) Prior Publication Data

US 2006/0245864 A1 Nov. 2, 2006

(51) Int. Cl.
*B65G 65/46* (2006.01)

(52) U.S. Cl. ........................................ 414/311; 414/310

(58) Field of Classification Search .................. 414/310, 414/311

See application file for complete search history.

(56) References Cited

U.S. PATENT DOCUMENTS 3,239,279 A * 3/1966 Hoffman, Jr. et al. .......... 406/57
3,647,094 A 3/1972 Jackson
4,313,705 A 2/1982 Jackson
4,619,577 A * 10/1986 Swanson ...................... 414/312
4,669,941 A * 6/1987 West et al. .................... 414/310
5,318,444 A 6/1994 Kuzub et al.
2004/0213650 A1* 10/2004 Epp et al. ...................... 414/310

* cited by examiner

*Primary Examiner* — Charles A Fox

(74) *Attorney, Agent, or Firm* — Adrian D. Battison; Ade & Company Inc.

(57) ABSTRACT

A discharge system for a grain storage bin has a discharge auger extending from the center of the bin floor to an exterior location and a sweep auger pivotally supported at an inner end on a post at the center and extending across the floor to the periphery of the bin for sweeping movement over the floor. The sweep auger is carried on a pivot link arm which pivots at one end on the post and at the other end on the sweep auger to allow it to move from a first position along one side of the discharge auger to a second position along the other side. The sweep auger is driven by a wheel at the outer end carried on a plate attached to an end plate of the shroud of the sweep auger and extending parallel thereto to a location behind the shroud at which is located the hydraulic motor directly driving the wheel with the motor shaft parallel to the auger shaft and behind the shroud. An extra weight plate can be slid into a receptacle on the mounting plate.

11 Claims, 3 Drawing Sheets

10
11
12
15B
21A
19
18
15
27
22
23
28
29
18A
16
17
18B
15C
61
42
15A
13
62
18C
60
13A
80

75
70
73
74
44
41
71
40
31
72
45
47
31A
30
21
32
16
33
34

BIN SWEEP AUGER

The present invention relates to a sweep auger and more particularly to a drive system for a sweep auger of the type typically used in a particulate material storage bin.

BACKGROUND

In particulate material storage bins it is common practice to provide an auger system for unloading the bin. In U.S. Pat. No. 4,669,941 to West et al issued Jun. 2, 1987 is disclosed a bin sweeping auger for use in particulate material storage bins. A main auger extends form a center of the bin through one part of the wall for discharging the material from the center of the bin. A bin sweep auger is provided which carries out a sweeping movement about the bin floor from a position at one side of the main auger around an angle of just less than 360 degrees to a position on the other side of the main auger. At each position on either side of the main auger the bin sweep auger is parallel to the main auger and this movement is obtained by mounting the sweep auger on a double pivot arm arrangement where a first pivot point is provided at the center of the bin and a second pivot point at the outer end of a mounting arm is provided a short distance outwardly from the center.

This arrangement is commonly adopted and one difficulty in utilizing a system of this type is in providing drive to the bin sweep to carry it around the bin from one side position to the other.

Commonly the bin sweep is driven around the bin by a ground engaging wheel on an outside end of the sweep auger. The wheel is driven directly from the auger or in some cases is driven at reduced rotation rate, bearing in mind that the auger moves very slowly around the bin as it moves the material toward to center of the bin. Thus the rotational movement is very much slower than the rotation of the auger flight so the wheel is required to skid on the ground so that wear is applied to both the floor and the wheel. Also this drive system requires the use of friction which can of course fail to provide the necessary forwarding force in some cases so that the auger can become stuck.

Other systems of driving are known including positive drive elements arranged at the outer periphery of the bin. These do not work effectively in an arrangement which uses the double pivot connection since the position of the outside of the auger flight can vary relative to the outside of the bin.

In U.S. Pat. No. 5,318,444 (Kuzub et al) is shown in FIG. 8 an arrangement in which an outer end of the sweep auger is driven by a toothed wheel where the teeth engage onto the ground at the end of the auger flight. The toothed wheel is driven by an indexing arrangement so that each rotation of the auger flight rotates the toothed wheel through only a small increment significantly less than one rotation. In this way the toothed wheel is driven at a much slower rate than the auger flight to avoid rapid slippage of the toothed wheel on the floor which can cause significant wear and damage. However this arrangement has not achieved success and has not been adopted in other devices of this general type.

In U.S. Pat. Nos. 3,647,094 and 4,313,705 both of (Jackson) issued in 1972 and 1982 respectively is shown a complex multi-part auger carried on a series of ground wheels at spaced positions along the length of the multi-part auger. The auger is driven in its rotation around a central fixed point by hydraulic motors which are carried on the auger system and drive ground wheels through complex gear and chain arrangements. Again this arrangement has not been adopted in recent bin sweep arrangements.

SUMMARY

It is one object of the present invention to provide an improved bin sweep auger having a convenient simple drive arrangement which effectively provides the driving force for moving the sweep around the bin.

According to one aspect of the present invention there is provided a sweep auger assembly for use in a storage bin for particulate material having a bin floor and a generally cylindrical bin wall upstanding from the floor and a discharge apparatus for discharging material from a center of the bin floor to an exterior location, the sweep auger assembly comprising:

a sweep auger arranged to be pivotally supported at an inner end of the sweep auger for location adjacent the center of the bin so as to extend therefrom across the floor to an outer end for movement of the outer end of the sweep auger about a periphery of the bin for sweeping movement of the sweep auger over the floor;

a mounting member to be mounted at the center of the bin for supporting the inner end of the sweep auger;

the sweep auger including an auger shaft, an auger flight mounted on the shaft, a motor for driving rotation of the auger shaft about a longitudinal axis of the shaft, and a shroud for partly surrounding the flight at least at the rear;

the shroud including two end plates at right angles to the shaft each including a support for a respective end of the shaft, including an inner end plate and an outer end plate spaced outwardly from the mounting member;

and a drive assembly for driving the sweep auger around the mounting member, the drive assembly comprising:

a hydraulic motor with a drive shaft thereon;

a wheel carried on the drive shaft of the hydraulic motor so as to be rotated by the drive shaft in response to supply of hydraulic fluid to the motor;

and a mounting assembly for mounting the hydraulic motor at the outer end plate, the mounting assembly being arranged to locate the wheel adjacent the outer end plate with the shaft of the motor parallel to the auger shaft.

Preferably the mounting assembly includes a mounting plate which includes fastening elements for fastening to the outer end plate.

Preferably the mounting plate is parallel to the end plate and is fastened thereto so as to extend therefrom.

Preferably the mounting plate extends rearwardly from the end plate.

Preferably the mounting assembly is arranged such that the motor is behind the shroud relative to the direction of movement of the sweep auger.

Preferably the mounting assembly includes a receptacle for receiving a weight member to apply additional weight to the sweep auger at the wheel.

Preferably the weight member comprises a plate parallel to the mounting plate.

Preferably the receptacle comprises a pair of U-shaped members defining a channel into which the weight plate slides.

Preferably the motor is connected by a pair of hydraulic lines to a valve arranged to be located outside the bin such that an operator outside the bin can control the speed of the bin sweep.

Preferably a mounting arm is connected to the post at a center pivot location defining a first generally upright pivot axis around which the arm can rotate; a pivot coupling connecting the inner end of the sweep auger to an outer end of the arm for pivotal movement of the sweep auger relative to the arm about a second generally upright axis; the length of the mounting arm from the first axis to the second axis is arranged such that the sweep auger can move from a first position along one side of the discharge apparatus and generally parallel thereto to a second position along the other side of the discharge apparatus and generally parallel thereto; the mounting arm is generally at an angle of the order of 90 degrees to the sweep auger in the first position and moving through a position in which the arm is generally at an angle of the order of 180 degrees to the sweep auger to the second position in which the mounting arm is at an angle of the order of 270 degrees relative to the sweep auger.

According to a second aspect of the invention there is provided a sweep auger assembly for use in a storage bin for particulate material having a bin floor and a generally cylindrical bin wall upstanding from the floor and a discharge apparatus for discharging material from a center of the bin floor to an exterior location, the sweep auger assembly comprising:

a sweep auger arranged to be pivotally supported at an inner end of the sweep auger for location adjacent the center of the bin so as to extend therefrom across the floor to an outer end for movement of the outer end of the sweep auger about a periphery of the bin for sweeping movement of the sweep auger over the floor;

a mounting member to be mounted at the center of the bin for supporting the inner end of the sweep auger;

the sweep auger including an auger shaft, an auger flight mounted on the shaft, a motor for driving rotation of the auger shaft about a longitudinal axis of the shaft, and a shroud for partly surrounding the flight at least at the rear;

the shroud including two end plates at right angles to the shaft each including a support for a respective end of the shaft, including an inner end plate and an outer end plate spaced outwardly from the mounting member;

and a drive assembly for driving the sweep auger around the mounting member, the drive assembly comprising:

a hydraulic motor with a drive shaft thereon;

a wheel carried on the drive shaft of the hydraulic motor so as to be rotated by the drive shaft in response to supply of hydraulic fluid to the motor;

and a mounting assembly for mounting the hydraulic motor at the outer end plate, wherein the motor is connected by a pair of hydraulic lines to a valve arranged to be located outside the bin such that an operator outside the bin can control the speed of the bin sweep.

BRIEF DESCRIPTION OF THE DRAWINGS

In the accompanying drawings, which illustrate an exemplary embodiment of the present invention.

DETAILED DESCRIPTION

Figure 1:
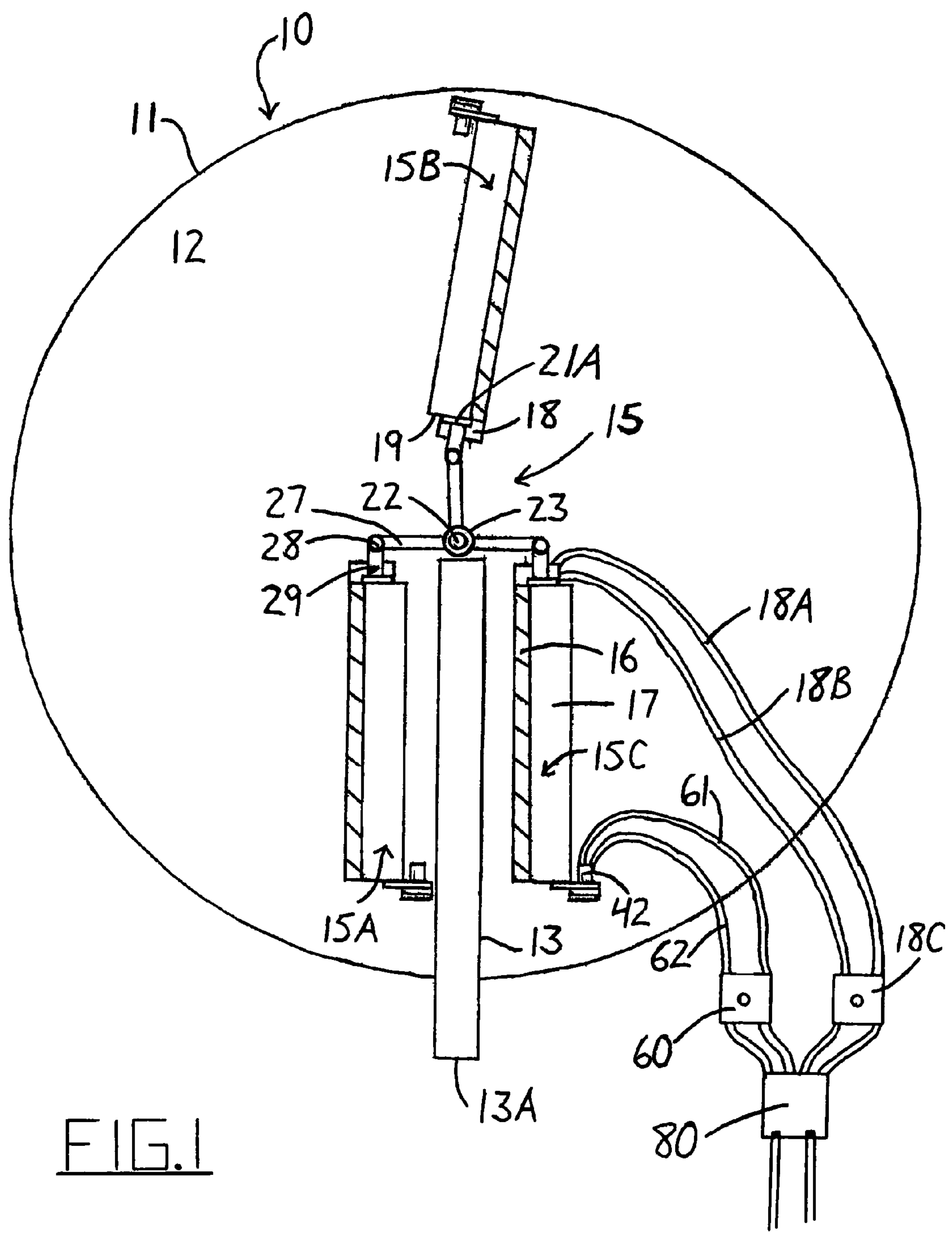
FIG. 1 is a top plan view of a bin discharge system according to the present invention including a generally conventional auger discharge system and a drive for the bin sweep according to the present invention.

In FIG. 1 is shown schematically the bin discharge system for discharging a flow able particulate material from a grain bin 10 having a bin wall 11 standing upwardly from a circular bin floor 12.

As shown for example in the above U.S. Pat. No. 4,669,941 (West), it is conventional to provide to discharge from a bin of this type a discharge auger 13 which extends from a position adjacent the center of the bin through an opening at one part of the side wall of the bin to a discharge system exteriorly of the bin at the end of the discharge auger 13 as indicated schematically at 13A. The arrangement of the discharge auger, its mounting at the center of the bin and its support at the side wall can vary in accordance with various different designs well known to one skilled in the art and therefore this arrangement is shown only schematically. While the arrangement is preferably of the auger type which uses a helical rotating flight, other types of transportation arrangement through the discharge assembly at indicated at 13 can be used again as well known to one skilled in the art.

A bin sweep auger for drawing the material to the center is indicated schematically at 15. This is shown in three separate positions indicated at 15A, 15B and 15C showing the movement of the bin sweep from a start position around the bin to a stop position where the sweeping action is completed. A single bin sweep makes this movement and the arrangement is shown in three separate positions in full line merely for convenience of illustration.

The bin sweep generally indicated at 15 comprises an auger flight 16 mounted on a shaft 21 within a shroud 17. The shaft is driven by a motor 18 carried on an end plate 19 at the inner end of the sweep auger. The auger and shroud are of a conventional nature so that the shroud engages around the rear of the auger flight to assist in carrying the material inwardly with the front of the bin sweep auger open to receive the material from the front as the sweep auger moves in a clockwise direction around the bin. The shroud may be mounted on wheels or other support to allow it to move over the floor 12 or simply the shroud may be carried on the auger flight which skids or scraps over the floor surface during its action.

The end plate 19 carries the motor 18 on its outer surface as best shown in FIG. 1 and the motor is generally a hydraulic motor driven by suitable hydraulic fluid from a pressure source through hydraulic cables 18A, 18B. The end plate 19 which supports the auger shaft 21 on suitable bearings 21A provides a mounting for the auger for connecting the auger to a support at the center of the bin.

As best shown in FIG. 1, at the center of the bin is located a post or pin 22 about which the sweep auger 15 rotates on a collar 23. The post or pin 22 is fastened to the floor 12 by suitable fasteners.

The collar 23 rotates on a simple swivel coupling since the auger of course moves very slowly in its action around the bin. The collar 23 carries a mounting arm 27 which extends radially outwardly in a horizontal plane from the collar 23 at a position raised form the floor 12 the mounting arm 27 has at its outer end a pivot coupling 28 to which is attached a further connecting arm 29 which extends from the pivot coupling 28 to the plate 19. Thus the plate 19 is attached to the pin 22 by a double pivot arrangement defined by the arms 27 and 29.

The double pivot arrangement defined by the arms 27 and 29 allows the sweep auger to take the three positions shown in FIG. 1. Thus in the first position shown at 15A the sweep auger is arranged immediately along side the discharge auger 13 and extends parallel thereto in park position. In this position the arm 27 extends radially from the post 22 but at right angles to the arm 29 and the shaft of the auger 15. In the third position at the end of a completed path of movement indicated at 15C, again the sweep auger is parked along side the discharge auger 13 parallel thereto with the arm 27 at right angles to the length of the auger.

In movement between the three positions, the auger moves initially by pivoting around the pivot 28 while the arm 27 remains stationary so that the auger moves to a nine o-clock position in FIG. 1 in which the arm 27 and the arm 29 are substantially co-linear. Once this position is reached, both the arm 27 and the arm 29 then continue to rotate around the center pin as the auger moves around from the nine o'clock position to the three o'clock position. From the three o'clock position to the parked position, again the arm 27 remains stationary while the arm 29 pivots about the coupling 28 to move to the parked position 15C.

It will be appreciated that the force on the auger flight from the particulate material that is pulled towards the center tends to pull the auger flight outwardly toward the outside of the bin so that the tendency of the arrangement is that the arms 27 and 29 take up the co-linear position due to the pulling action outwardly tending to move the outer end of the auger flight toward the bin wall. Thus the auger flight tends to pull outwardly so as to take up the position immediately adjacent the bin wall, bearing in mind that the lengths are selected so that the outer end of the auger flight just reaches the bin wall when the arms 27 and 29 are co-linear.

Figure 2:
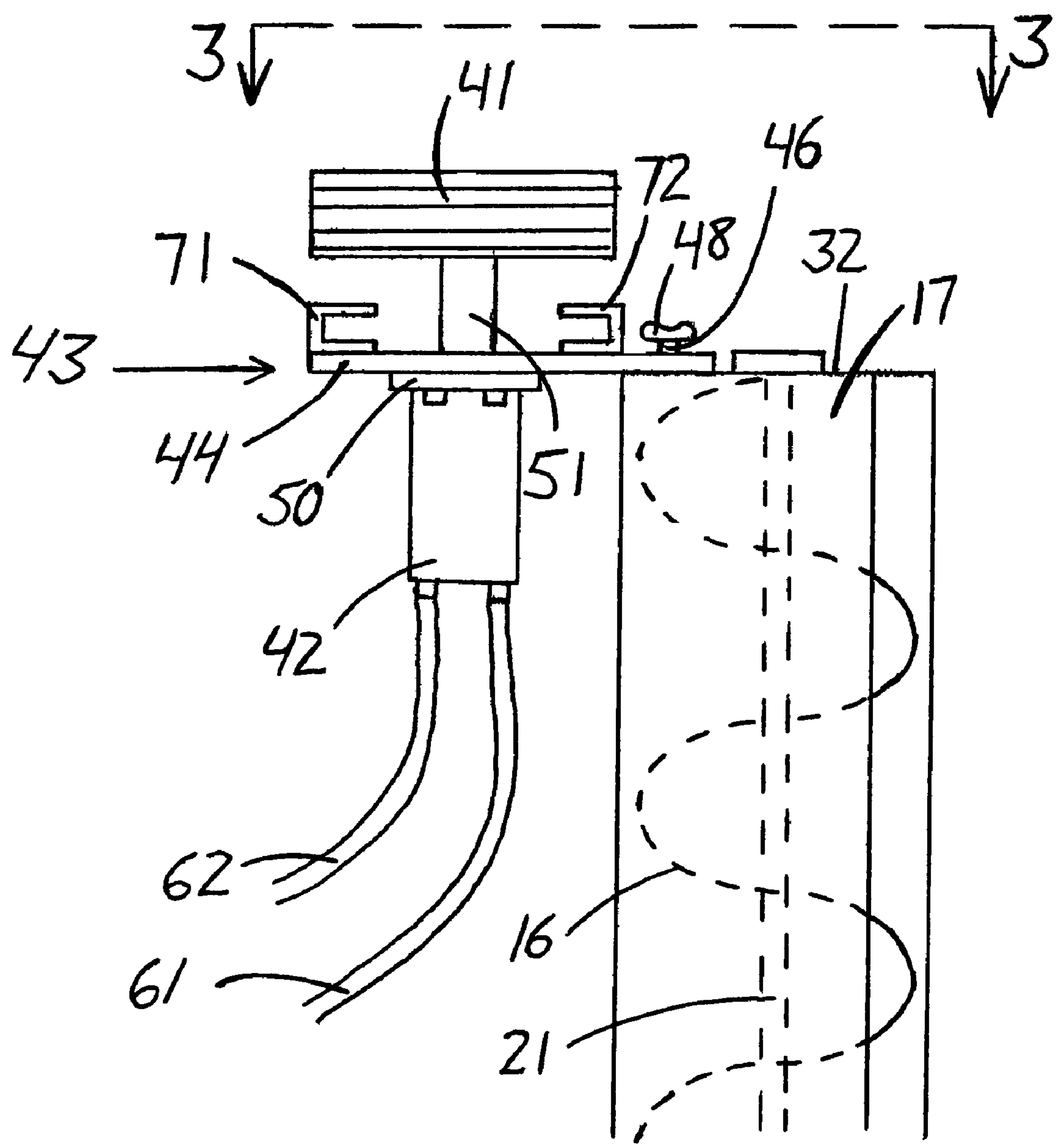
FIG. 2 is a top plan view on an enlarged scale showing the drive system of FIG. 1.
Figure 3:
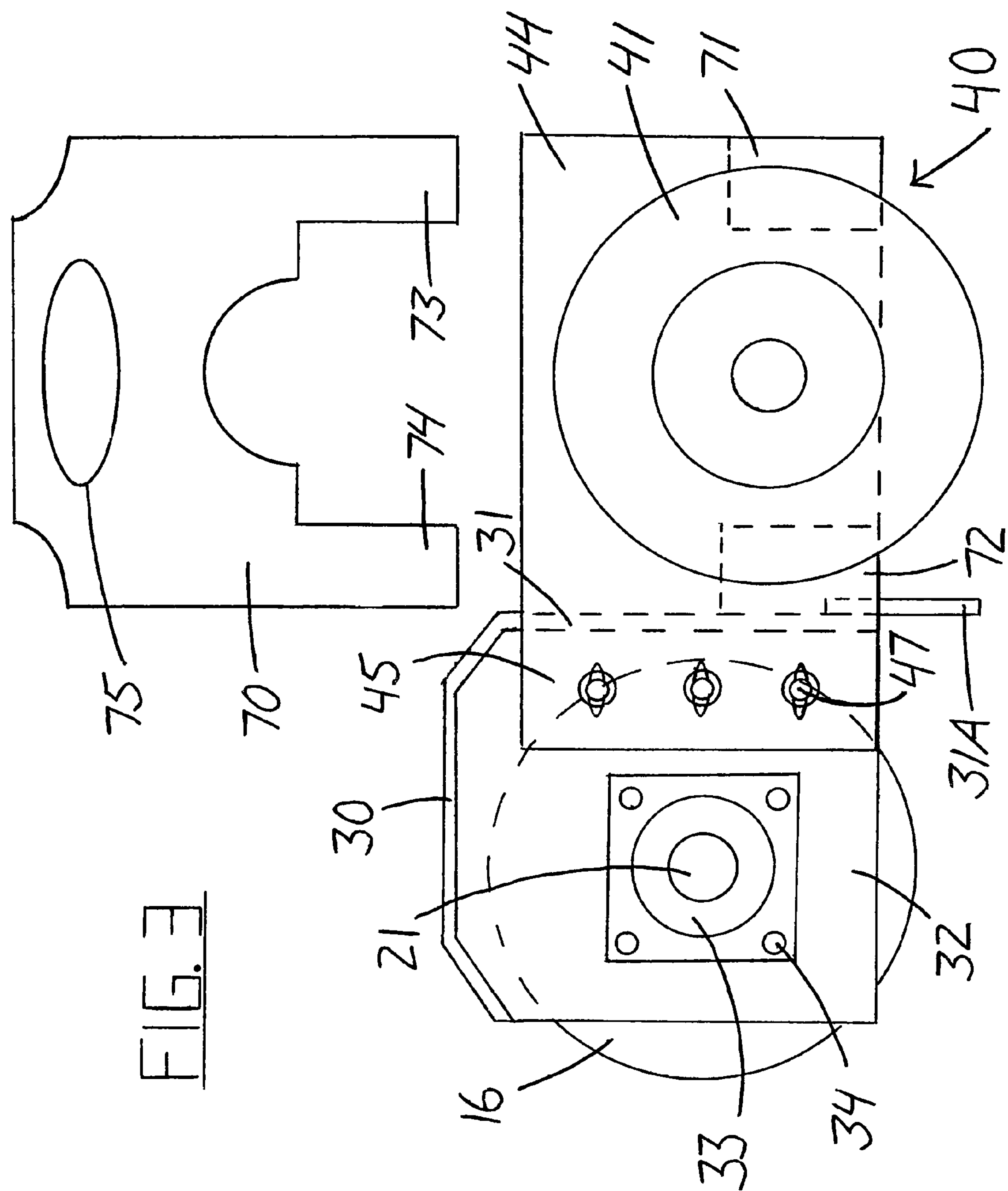
FIG. 3 is an end elevational view on an enlarged scale showing the drive system according to the present invention.

In FIGS. 2 and 3 is shown the drive arrangement of the sweep auger. The sweep auger thus comprises the shroud 17 which has top wall 30 extending over the top of the flight 16 carried on the shaft 21. The shroud further has a rear wall 31 depending down the rear of the flight 16 together with a wear strip 31A at the bottom edge of the rear wall 31 which can contact the ground if required and can act to sweep crop material forwardly into the flight for transportation with the flight along the length of the auger to the central position and a discharge auger 13.

The shroud further includes an end plate 32 at right angles to the shaft 21. The end plate 32 is welded to the top wall 30 and the rear wall 31 so as to be fixed at right angles to the shaft 21. The shaft 21 is carried in bearings 33 bolted to the end plate 32 by bolts 34.

The sweep auger is driven by a drive assembly generally indicated at 40 which includes a ground wheel 41 and a directly connected hydraulic motor 42. The drive assembly 40 includes a mounting assembly 43 in the form of a flat plate 44 which is parallel to and attached to the end plate 32. Thus the plate 43 includes an end portion 45 which overlaps with a rear part of the plate 32 behind the auger flight and adjacent the rear wall 31. At the overlap portion between the plate 44 and the plate 32 is provided a plurality of threaded fasteners 46. Thus the plate 32 carries a plurality of studs 47 which project outwardly beyond the end of the sweep auger so that the studs can pass through corresponding holes in the plate portion 45 and the plate portion 45 can be fastened onto the stud by wing nuts 48. Thus the plate 44 is parallel to and fastened rigidly to the plate 32 and projects rearwardly from the rear wall 31 so the main body of the plate 44 is located behind the rear wall 31 and behind the sweep auger. The plate 44 carries the motor 42 which is fastened thereto on a base plate 50 of the motor which is bolted onto the surface of the plate 44 facing toward the center of the bin that is the inside surface of the plate 44. The motor 42 includes an integral shaft 51 driven by the motor. Motors of this type are well known and commercially available and provide a rate of rotation of the shaft 51 which is variable in dependence upon the adjustment of the motor and the rate of flow of fluid through the hydraulic motor. The shaft is integral with and directly connected to the motor so that it projects from the motor beyond the plate 50 and thus beyond the plate 44 to carry the wheel 41 on a side of the plate 44 opposite to the motor. Thus the wheel 41 is mounted on the outside of the plate 44 and thus beyond the end of the auger and the end plate 32. The motor is directly connected to the wheel and the motor has its shaft 51 parallel to the shaft 21 of the auger. The motor is simply and directly mounted by the plate onto the auger in a manner which allows the wheels to be directly driven and the wheel to support the auger for movement over the ground. The rate of rotation of the wheel can be controlled by a valve 60 outside the bin and coupled to the motor 42 by hydraulic coupling lines 61 and 62.

A receptacle for an additional weight member 70 is provided on the outside surface of the plate 44. The receptacle comprises a pair of U-shaped channels 71 and 72 which face toward one another on the outside surface of the plate 44 so that corresponding shaped legs 73 and 74 of the weight member 70 can slide into the receptacle defined by the channels to sit against the outside surface of the plate 44. The plate forming the weight member 70 is relatively fixed so that it has a significant weight generally greater than that of the drive assembly itself so as to apply significant additional downward force onto the wheel and onto the outer end of the auger flight to provide increased downward pressure into the material to be discharged and additional pressure onto the ground to provide additional frictional force of the wheel on the ground. A handle 75 is provided on top of the weight member so that it can be readily removed if not required.

The drive assembly 40 including the wheel, motor and mounting assembly can be readily removed from the auger by simply removing the fasteners 46. Thus the drive assembly and its hydraulic lines 61 and 62 can be removed from the bin and moved to another bin at another bin sweep auger located within another bin.

The bin sweep is thus driven by hydraulics from a suitable supply generally a tractor which has a hydraulic output coupling 80 connected to the valve 60 and to a control valve 18C for the motor 18 of the auger flight. These are shown schematically in FIG. 1 but are located to the exterior of the bin with the hydraulic lines simply draped across the floor to the required location. Each valve can be manually adjusted so as to control the rate of rotation of the auger flight and the rate of rotation of the wheel. These rates of rotation are very different so that the auger flight may rotate at approximately 300 rpm whereas the wheel might rotate at a rotation rate of 1 rpm so as to only very slowly move the auger flight across the floor while the auger flight is moving rapidly relative to the floor.

The operator being located outside of the bin is kept away from danger of the rapidly rotating auger flight. The operator located outside the bin can observe the rate of movement of the auger across the floor surface and can adjust this to a required rate by adjusting the valve 60. In practice the operator will set a time period for rotation of the auger around the bin which might be of the order of ten minutes so that the wheel rotates at a rate sufficient to ensure that the auger flight moves around the bin during this required time period to remove the material from the flow of the bin. Generally therefore the operator does not need to operate the valve on a continuous adjustment basis but simply sets a suitable speed of movement of the auger and then can continue with other operations as required.

In this way any slippage of the wheel relative to the floor can be removed by lowering the rate of rotation accordingly. However in some cases the rate of rotation might be set at a slightly higher rate than the actual forward speed so that some slippage does occur. However, as the rate of rotation of the wheel is relatively slow in comparison with the rate of rotation of the auger flight, the auger itself cannot move rapidly toward a person within the bin, should the operator enter the bin for any purpose. Even if the operator therefore were to fall, it is not possible for the auger to move rapidly toward the operator as may occur when high slippage systems are used.

While one embodiment of the present invention has been described in the foregoing, it is to be understood that other embodiments are possible within the scope of the invention. For example, in further embodiments, the chain and gears of the sweep drive may be replaced by any suitable pulley and cable configuration or a variation of different track designs in which an annular member is driven to rotate about the periphery of the bin. The invention is to be considered limited solely by the scope of the appended Claims.

The invention claimed is:

1. A sweep auger assembly for use in a storage bin for particulate material having a bin floor and a generally cylindrical bin wall upstanding from the floor and a discharge apparatus for discharging material from a center of the bin floor to an exterior location, the sweep auger assembly comprising:

a sweep auger arranged to be pivotally supported at an inner end of the sweep auger for location adjacent the center of the bin so as to extend therefrom across the floor to an outer end for movement of the outer end of the sweep auger about a periphery of the bin for sweeping movement of the sweep auger over the floor;

a mounting member to be mounted at the center of the bin for supporting the inner end of the sweep auger;

the sweep auger including an auger shaft, an auger flight mounted on the shaft, a motor for driving rotation of the auger shaft about a longitudinal axis of the shaft, and a shroud for partly surrounding the flight at least at the rear;

the shroud including two end plates at right angles to the shaft each including a support for a respective end of the shaft, including an inner end plate and an outer end plate spaced radially outwardly from the mounting member;

and a drive assembly for driving the sweep auger in rotation around the mounting member, the drive assembly comprising:

a hydraulic motor with a drive shaft thereon;

a wheel carried on the drive shaft of the hydraulic motor so as to be driven in rotation by the drive shaft in response to supply of hydraulic fluid to the motor;

and a mounting assembly for mounting the hydraulic motor on the sweep auger at the outer end plate, the mounting assembly being arranged to locate the wheel adjacent the outer end plate with the shaft of the motor parallel to the auger shaft and with the wheel in engagement with the bin floor such that rotation of the wheel driven by the drive shaft of the motor causes rotation of the sweep auger around the bin.

2. The sweep auger according to claim 1 wherein the mounting assembly includes a mounting plate which includes fastening elements for fastening to the outer end plate.

3. The sweep auger according to claim 1 wherein the mounting plate is parallel to the end plate and is fastened thereto so as to extend therefrom.

4. The sweep auger according to claim 1 wherein the mounting plate extends rearwardly from the end plate.

5. The sweep auger according to claim 1 wherein the mounting assembly is arranged such that the motor is behind the shroud relative to the direction of movement of the sweep auger.

6. The sweep auger according to claim 1 wherein the mounting assembly includes a receptacle for receiving a weight member to apply additional weight to the sweep auger at the wheel.

7. The sweep auger according to claim 1 wherein the weight member comprises a plate parallel to the mounting plate.

8. The sweep auger according to claim 6 wherein the receptacle comprises a pair of U-shaped members defining a channel into which the weight plate slides.

9. The sweep auger according to claim 1 wherein the motor is connected by a pair of hydraulic lines to a valve arranged to be located outside the bin such that an operator outside the bin can control the speed of the bin sweep.

10. The sweep auger according to claim 1 wherein a mounting arm is connected to the post at a center pivot location defining a first generally upright pivot axis around which the arm can rotate;

a pivot coupling is provided connecting the inner end of the sweep auger to an outer end of the arm for pivotal movement of the sweep auger relative to the arm about a second generally upright axis;

the length of the mounting arm from the first axis to the second axis is arranged such that the sweep auger can move from a first position along one side of the discharge apparatus and generally parallel thereto to a second position along the other side of the discharge apparatus and generally parallel thereto;

the mounting arm is generally at an angle of the order of 90 degrees to the sweep auger in the first position and moving through a position in which the arm is generally at an angle of the order of 180 degrees to the sweep auger to the second position in which the mounting arm is at an angle of the order of 270 degrees relative to the sweep auger.

11. A sweep auger assembly for use in a storage bin for particulate material having a bin floor and a generally cylindrical bin wall upstanding from the floor and a discharge apparatus for discharging material from a center of the bin floor to an exterior location, the sweep auger assembly comprising:

a sweep auger arranged to be pivotally supported at an inner end of the sweep auger for location adjacent the center of the bin so as to extend therefrom across the floor to an outer end for movement of the outer end of the sweep auger about a periphery of the bin for sweeping movement of the sweep auger over the floor;

a mounting member to be mounted at the center of the bin for supporting the inner end of the sweep auger;

the sweep auger including an auger shaft, an auger flight mounted on the shaft, a motor for driving rotation of the auger shaft about a longitudinal axis of the shaft, and a shroud for partly surrounding the flight at least at the rear;

the shroud including two end plates at right angles to the shaft each including a support for a respective end of the shaft, including an inner end plate and an outer end plate spaced radially outwardly from the mounting member;

and a drive assembly for driving the sweep auger around the mounting member, the drive assembly comprising:

a hydraulic motor with a drive shaft thereon;

a wheel carried on the drive shaft of the hydraulic motor so as to be driven in rotation by the drive shaft in response to supply of hydraulic fluid to the motor;

and a mounting assembly for mounting the hydraulic motor on the sweep auger at the outer end plate, the mounting assembly being arranged to locate the wheel adjacent the outer end plate with the shaft of the motor parallel to the auger shaft and with the wheel in engagement with the bin floor such that rotation of the wheel driven by the drive shaft of the motor causes rotation of the sweep auger around the bin;

a hydraulic motor with a drive shaft thereon;

a wheel carried on the drive shaft of the hydraulic motor so as to be driven in rotation by the drive shaft in response to supply of hydraulic fluid to the motor;

wherein the motor is connected by a pair of hydraulic lines to a valve arranged to be located outside the bin such that an operator outside the bin can control the speed of the bin sweep.

* * * * *